US006913847B2

United States Patent
Wells et al.

(10) Patent No.: US 6,913,847 B2
(45) Date of Patent: Jul. 5, 2005

(54) FUEL CELL SYSTEM HAVING A HYDROGEN SENSOR

(75) Inventors: Brian Wells, Vancouver (CA); Kenneth W. Strang, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 393 days.

(21) Appl. No.: 09/916,212

(22) Filed: Jul. 25, 2001

(65) Prior Publication Data

US 2003/0022045 A1 Jan. 30, 2003

(51) Int. Cl.$^7$ .......................... H01M 8/04; H01M 8/12; H01M 8/00; H01M 2/00; H01M 2/02
(52) U.S. Cl. .......................... 429/26; 429/13; 429/22; 429/34; 429/38; 429/39
(58) Field of Search .............................. 429/26, 34, 35, 429/38, 39, 13, 22, 25

(56) References Cited

U.S. PATENT DOCUMENTS

| | | | |
|---|---|---|---|
| 2,988,656 A | 6/1961 | Grobel | 310/53 |
| 3,061,658 A | * 12/1962 | Blackmer | 429/26 |
| 4,078,893 A | 3/1978 | Gilman et al. | 23/253 TP |
| 4,197,675 A | 4/1980 | Kelly | 49/31 |
| 5,074,137 A | 12/1991 | Harris et al. | 73/31.02 |
| 5,132,663 A | 7/1992 | Strobl et al. | 340/438 |
| 5,199,396 A | 4/1993 | Shelef et al. | 123/198 D |
| 5,392,873 A | 2/1995 | Masuyama et al. | 180/68.5 |
| 5,397,655 A | 3/1995 | Bette et al. | 429/13 |
| 5,478,662 A | 12/1995 | Strasser | 429/13 |
| 5,763,113 A | 6/1998 | Meltser et al. | 429/13 |
| 6,124,054 A | 9/2000 | Gorman et al. | 429/34 |
| 6,140,820 A | 10/2000 | James | 324/434 |
| 6,159,626 A | 12/2000 | Keskula et al. | 429/22 |
| 6,290,594 B1 | 9/2001 | Osborne | 454/75 |
| 6,455,181 B1 | 9/2002 | Hallum | 429/13 |
| 6,461,751 B1 | * 10/2002 | Boehm et al. | 429/13 |
| 2001/0018142 A1 | 8/2001 | Kato et al. | 429/22 |
| 2002/0094469 A1 | 7/2002 | Yoshizumi et al. | 429/34 |

FOREIGN PATENT DOCUMENTS

| | | |
|---|---|---|
| EP | 982 788 A2 | 3/2000 |
| EP | 1 037 041 A2 | 9/2000 |
| EP | 1 111 703 A2 | 6/2001 |
| EP | 1 187 241 A2 | 3/2002 |
| WO | WO 94/09519 | 4/1994 |
| WO | WO 00/02282 | 1/2000 |
| WO | WO 00/74162 A1 | 12/2000 |
| WO | WO 01/26174 A1 | 4/2001 |
| WO | WO 01/43216 A2 | 6/2001 |

OTHER PUBLICATIONS

Abstract of JP 60–212966, esp@cenet database, Oct. 25, 1985.
Abstract of JP 63–241876, esp@cenet database, Oct. 7, 1988.

(Continued)

Primary Examiner—Carol Chaney
Assistant Examiner—Julian Mercado
(74) Attorney, Agent, or Firm—Seed IP Law Group PLLC

(57) ABSTRACT

An electric power generating system is provided that comprises a fuel cell stack having at least one solid polymer fuel cell, a cooling system having a coolant flow path that directs coolant to and from the stack, a fuel regulating system having a fuel flow path and for regulating the supply of fuel from a fuel supply to the stack via the fuel flow path, and a hydrogen concentration sensor. The sensor is located in the vicinity of the fuel regulating system and in the coolant flow path at a location downstream of the stack to detect hydrogen that may have been discharged by components of the power generating system in the coolant flow path upstream of the sensor, or by the fuel regulating system. In the event the measured hydrogen concentration exceeds a threshold level, steps are taken to reduce or stop the discharge of hydrogen from the power generating system.

28 Claims, 7 Drawing Sheets

OTHER PUBLICATIONS

Abstract of JP 2–078159, esp@cenet database, Mar. 19, 1990.
Abstract of JP 4–115467, esp@cenet database, Apr. 16, 1992.
Abstract of JP 4–220955, esp@cenet database, Aug. 11, 1992.
Abstract of JP 6–084536, esp@cenet database, Mar. 25, 1994.
Abstract of JP 7–325075, esp@cenet database, Dec. 12, 1995.
Abstract of JP 8–162138, esp@cenet database, Jun. 21, 1996.
Abstract of JP 8–185879, esp@cenet database, Jul. 16, 1996.
Abstract of JP 2000–009685, esp@cenet database, Jan. 14, 2000.
Jake de Vaal and Harvindra Deo, "Fuel Cell Ambient Enviroment Monitoring and Control Apparatus and Method," U.S. Appl. No. 09/916,241, Jul. 25, 2001.
Robert Kenneth Parr, "Fuel Cell Controller Self Inspection," U.S. Appl. No. 09/916,117, Jul. 25, 2001.
Brian Wells, "Fuel Cell Anomaly Detection Method and Apparatus," U.S. Appl. No. 09/916,115, Jul. 25, 2001.
Russell Howard Barton et al., "Fuel Cell Purging Method and Apparatus," U.S. Appl. No. 09/916,211, Jul. 25, 2001.
Brian Wells et al., "Fuel Cell Resuscitation Method and Apparatus," U.S. Appl. No. 09/916,213, Jul. 25, 2001.
Robert Kenneth Parr and Brian Wells, "Fuel Cell System Method, Apparatus and Scheduling," U.S. Appl. No. 09/916,240, Jul. 25, 2001.
David S. Manery, "Fuel Cell System Automatic Power Switching Method and Apparatus," U.S. Appl. No. 09/916,239, Jul. 25, 2001.
Russell Howard Barton and Tan Duc Uong, "Product Water Pump for Fuel Cell System," U.S. Appl. No. 09/916,118, Jul. 25, 2001.

* cited by examiner

FUEL CELL SYSTEM HAVING A HYDROGEN SENSOR

BACKGROUND OF THE INVENTION

1. Field of the Invention

The present invention relates to fuel cells, and particularly to a fuel cell system having a sensor for detecting the concentration of hydrogen in the vicinity of the system.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible.

SUMMARY OF THE INVENTION

Operating and environmental factors relevant to efficient fuel cell system operation may include the concentration of hydrogen in the surrounding environment, the concentration of oxygen in the surrounding environment, fuel cell stack temperature, ambient air temperature, current flow through the fuel cell stack, voltage across the fuel cell stack, and voltage across the MEAs. These factors become increasingly relevant when the fuel cell operating environment is a human habitable space with a low air flow exchange rate and/or when the space is small, such as a utility room or closet. Consequently, there is a need for improved control systems for fuel cell systems, particularly for fuel cell systems that operate in enclosed environments and/or habitable environments, and for methods of controlling such fuel cell systems.

According to an aspect of the invention, there is provided an electric power generating system comprising a fuel cell stack that comprises at least one solid polymer fuel cell, a fluid flow path for directing fluid to and from the stack, a fuel regulating system for regulating the supply of fuel from a fuel supply to the stack, and a hydrogen concentration sensor located in the fluid flow path at a location downstream of the stack for detecting hydrogen that is discharged or leaked from the power generating system.

Preferably, the hydrogen concentration sensor is also located in the vicinity of the fuel regulating system. The fuel regulating system may also be located in the fluid flow path and may comprise the following components: a fuel flow path for directing the fuel supply to the stack, a fuel supply connector for connecting the fuel supply to the fuel flow path, a pressure relief valve in the fuel flow path, and a main fuel valve also in the fuel flow path, and a fuel pressure regulator also in the fuel flow path. The fuel stream supplied to the stack comprises hydrogen.

The aforementioned fluid flow path is suitably a coolant flow path for directing coolant to and from the fuel cell stack, but may also be an oxidant flow path. The fuel cell stack may be air-cooled, in which case a cooling fan may be used to direct the coolant air to the stack via the coolant flow path. The coolant flow path between the cooling fan and the stack may be defined by a duct. The stack is preferably provided with coolant flow channels that enable the passage of coolant air through the stack. Coolant air exhausted from the stack is preferably directed by a portion of a power generating system housing to the hydrogen concentration sensor.

Preferably, the fuel regulating system is located in the coolant flow path at a location downstream of the stack. Hydrogen that may have been discharged or leaked from the stack or the fuel regulating system into the coolant air flow path will then be carried by the coolant air stream to the hydrogen concentration sensor.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
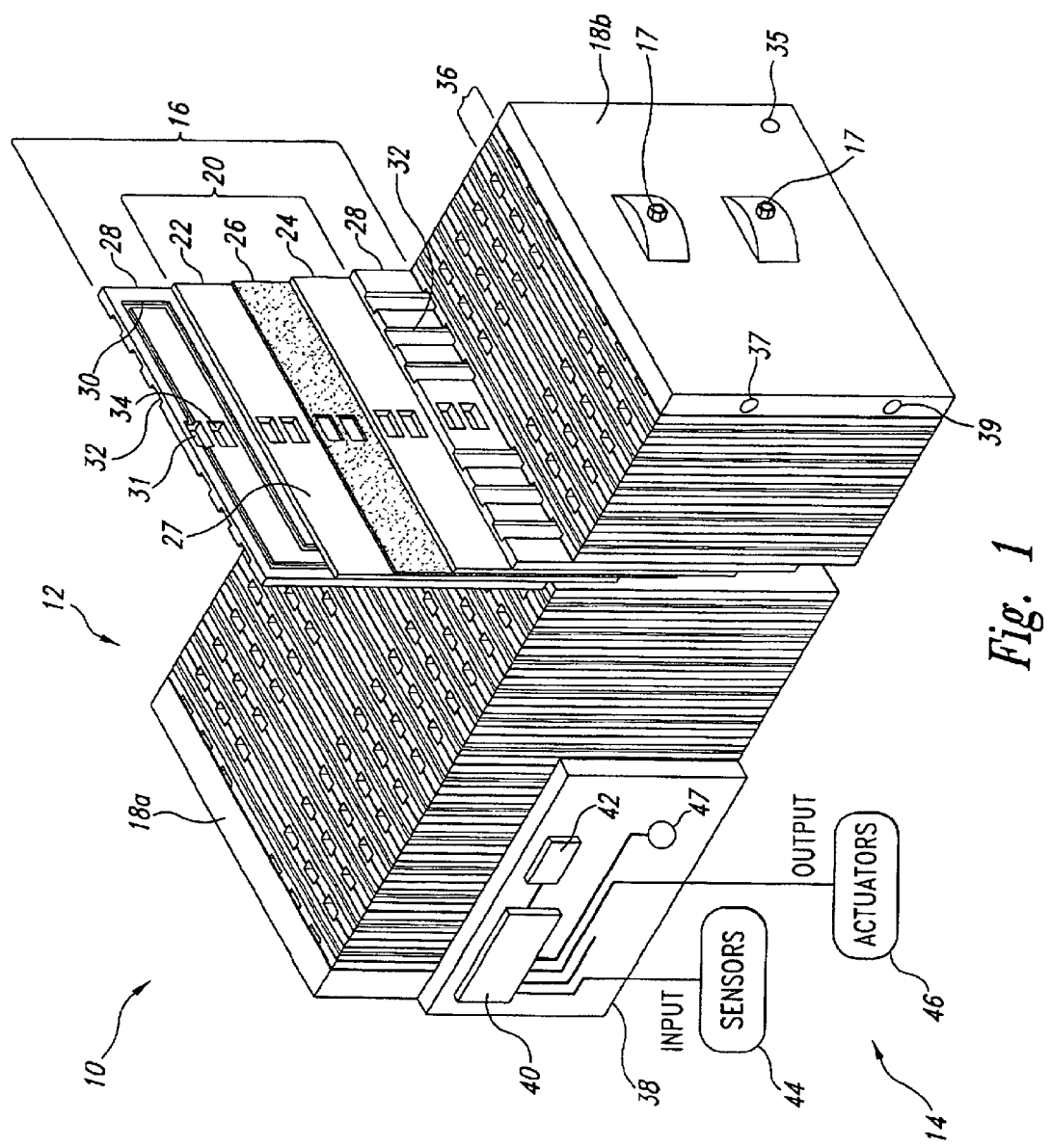
FIG. 1 is an isometric, partially exploded, view of a fuel cell system including a fuel cell stack and controlling electronics including a fuel cell ambient environment monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

The fuel cell assembly 16 also includes a pair of separators or flow field plates 28 sandwiching membrane electrode assembly 20. In the illustrated embodiment, each of the flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible in FIG. 1.) The reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. The cooling channels 32 transmit coolant air through the fuel stack 12. The cooling channels are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as coolant air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The end plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. The oxidant inlet port 37 is fluidly connected to the oxidant outlet port 39 via respective reactant channels 30 that are in fluid communication with oxidant supply and exhaust manifolds, respectively.

In one embodiment, the fuel cell stack 12 includes forty-seven fuel cell assemblies 16. (FIGS. 1 and 2 omit a number of the fuel cell assemblies 16 to enhance drawing clarity). The fuel cell stack 12 can include a greater or lesser number of fuel cell assemblies to provide more or less power, respectively.

Figure 2:
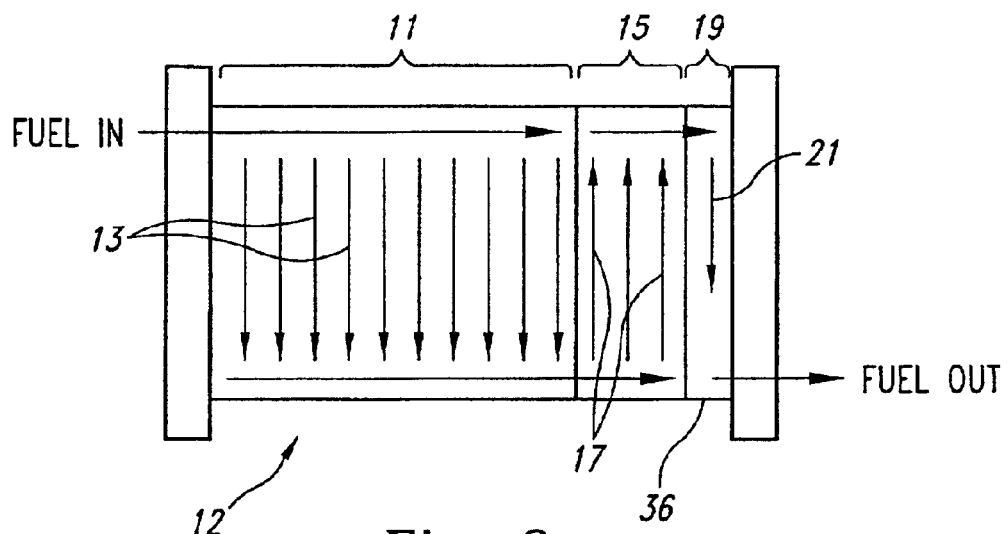
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through the fuel cell stack 12. The oxidant is supplied to each of the forty-seven fuel cells in parallel, in the same general direction as the flow of coolant through the fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactant streams (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, the electronic monitoring and control system 14 comprises various electrical and electronic components on a circuit board 38 and various sensors 44 and actuators 46 distributed throughout fuel cell system 10. The circuit board 38 carries a microprocessor or microcontroller 40 that is appropriately programmed or configured to carry out fuel cell system operation. microcontroller 40 can take the form of an Atmel AVR RISC microcontroller available from Atmel Corporation of San Jose, Calif. The electronic monitoring and control system 14 also includes a persistent memory 42, such as an EEPROM portion of microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic monitoring and control system 14 until fuel cell stack 12 can provide sufficient power to electronic monitoring and control system 14. Microcontroller 40 is selectively couplable between fuel cell stack 12 and battery 47 for switching power during fuel cell system operation and/or to recharge battery 47 during fuel cell operation.

Figure 3:
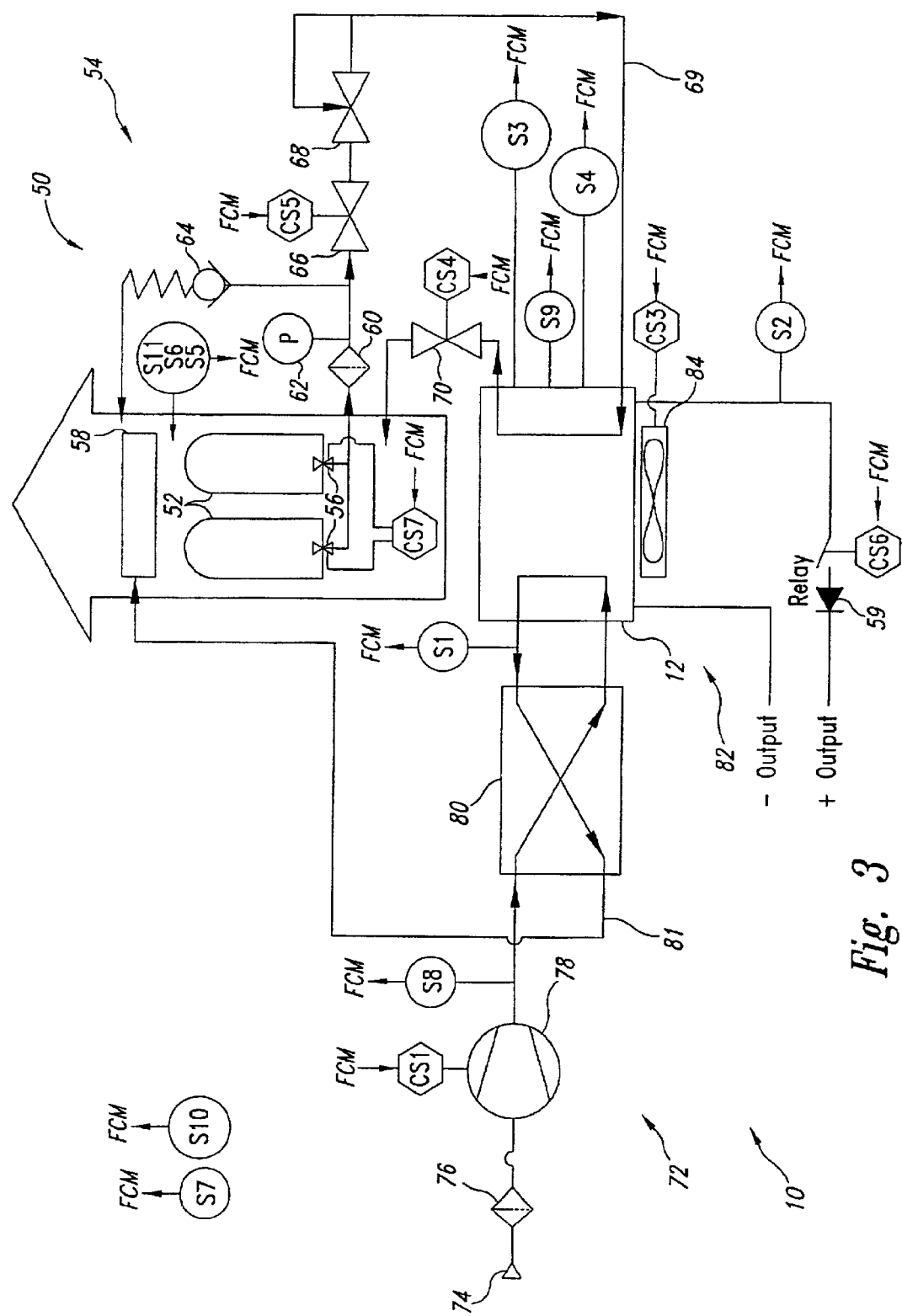
FIG. 3 is a schematic diagram of the fuel cell system as partly illustrated in FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to anode 22 by way of a fuel system 50. Fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. The fuel tanks 52 may be integral to fuel system 50 and/or fuel cell system 10, or can take the form of discrete units. In this embodiment, fuel tanks 52 are hydride storage tanks. Fuel tanks 52 are positioned within the fuel cell system 10 such that they are heatable by exhaust coolant air warmed by heat generated by fuel cell stack 12. Such heating facilitates the release of hydrogen from the hydride storage media.

Fuel system 50 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from microcontroller 40 to provide fluid communication between the fuel tanks 52 and fuel regulating system 54. Additional controllers such as a hydride valve solenoid CS7 controls flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of the electronic monitoring and control system 14 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cell assemblies 16 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g. nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36. The venting of hydrogen by the purge valve 70 by the purge valve during a purge is limited to prevent the ambient environment monitoring and control systems, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. The humidity exchanger 80 also removes water vapor which is a byproduct of the electrochemical reaction. Excess liquid water is provided to an evaporator 58.

The fuel cell system 10 removes excess heat from fuel cell stack 12 and uses the excess heat to warm fuel tanks 52 by way of a cooling system 82. Cooling system 82 includes a fuel cell temperature sensor S1, for example a thermister that monitors the core temperature of the fuel cell stack 12. The temperature is provided as input to microcontroller 40. A stack current sensor S2, for example a Hall sensor, measures the gross current through the fuel cell stack 12, and provides the value of the current as an input to microcontroller 40. A cooling fan controller CS3 controls the operation of one or more cooling fans 84 for cooling fuel cell stack 12. After passing through the fuel cell stack 12, the warmed coolant air circulates around the fuel tanks 52. The warmed coolant air then passes through the evaporator 58. A power circuit relay controller CS6 connects, and disconnects, fuel cell stack 12 to, and from, an external electrical circuit in response to microcontroller 40. A power diode 59 provides one-way isolation of the fuel cell system 10 from the external load to provide protection to the fuel cell system 10 from the external load. A battery relay controller CS8 connects, and disconnects, fuel cell monitoring and control system 14 between the fuel cell stack 12 and the battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
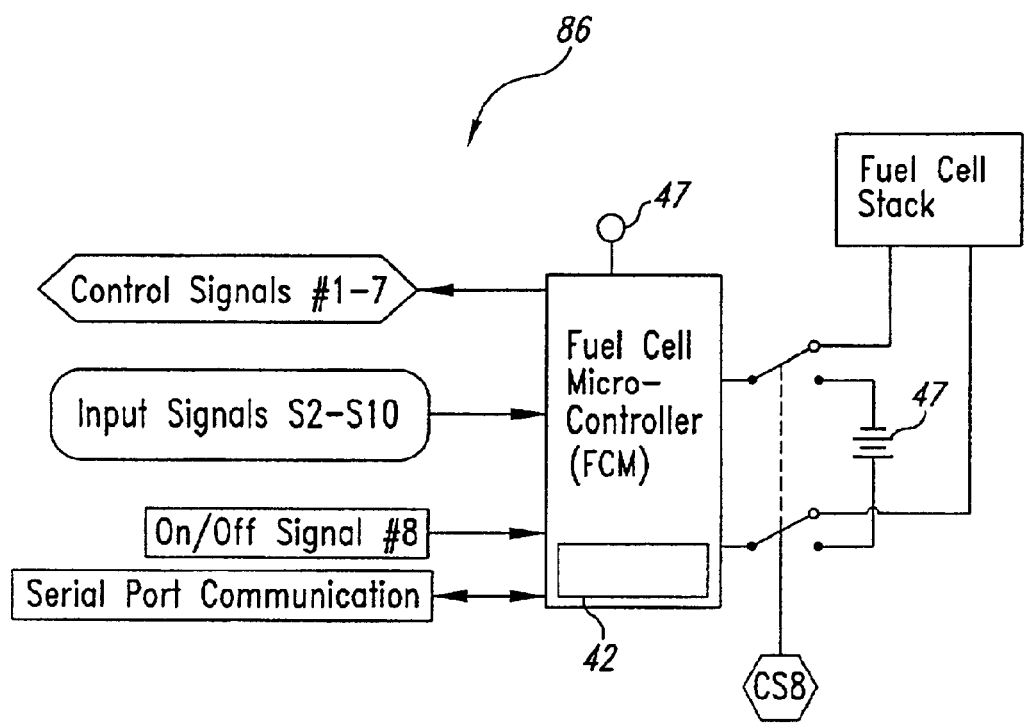
FIG. 4 is a schematic diagram of an additional portion of the fuel cell ambient environment monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of the illustrated fuel cell system 10 during operation, are not to be construed to limit the orientation of the fuel cell system 10 during operation or otherwise.

Figure 5:
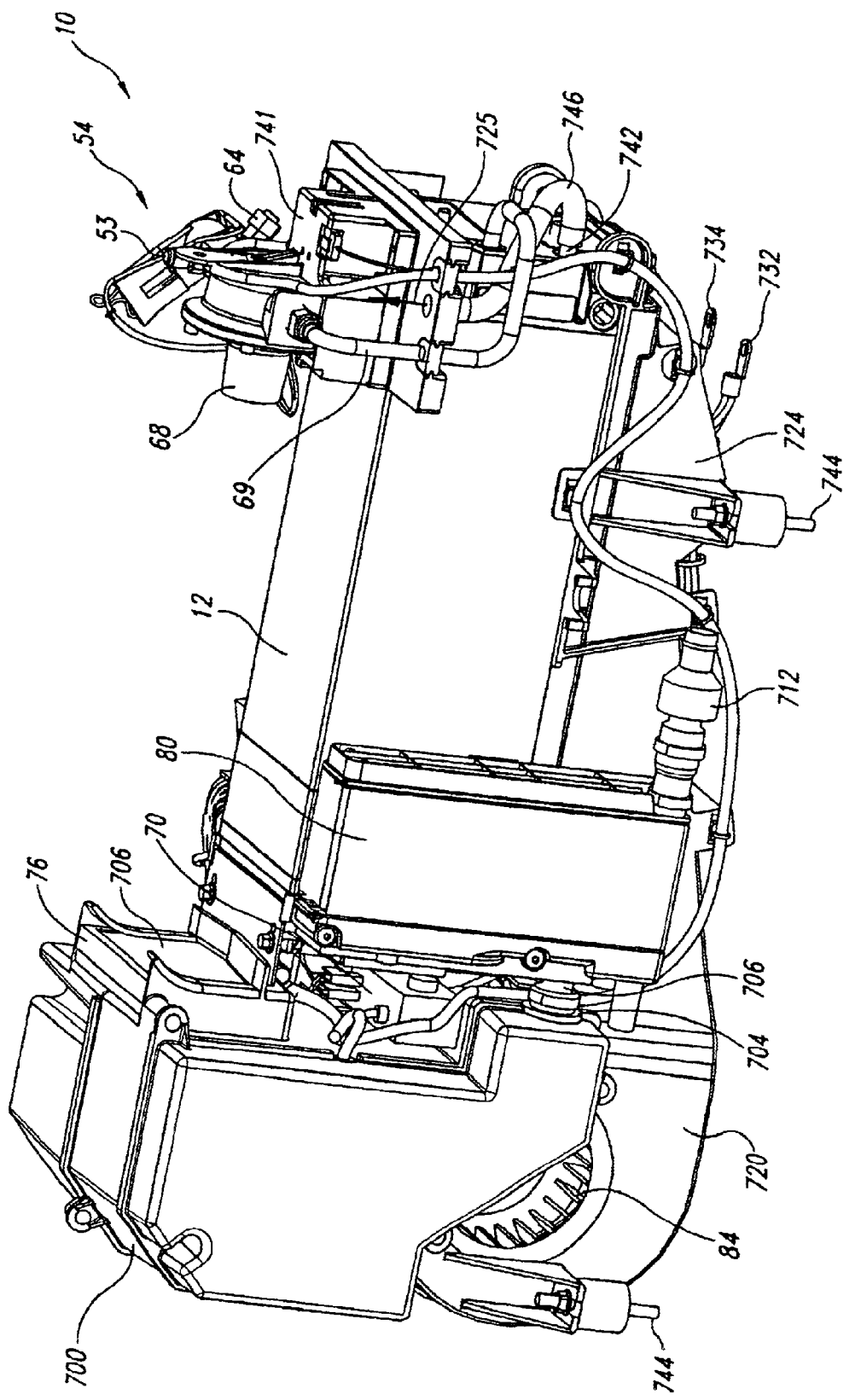
FIG. 5 is a top, right isometric view of a structural arrangement of various components of the fuel cell system of FIG. 1.
Figure 6:
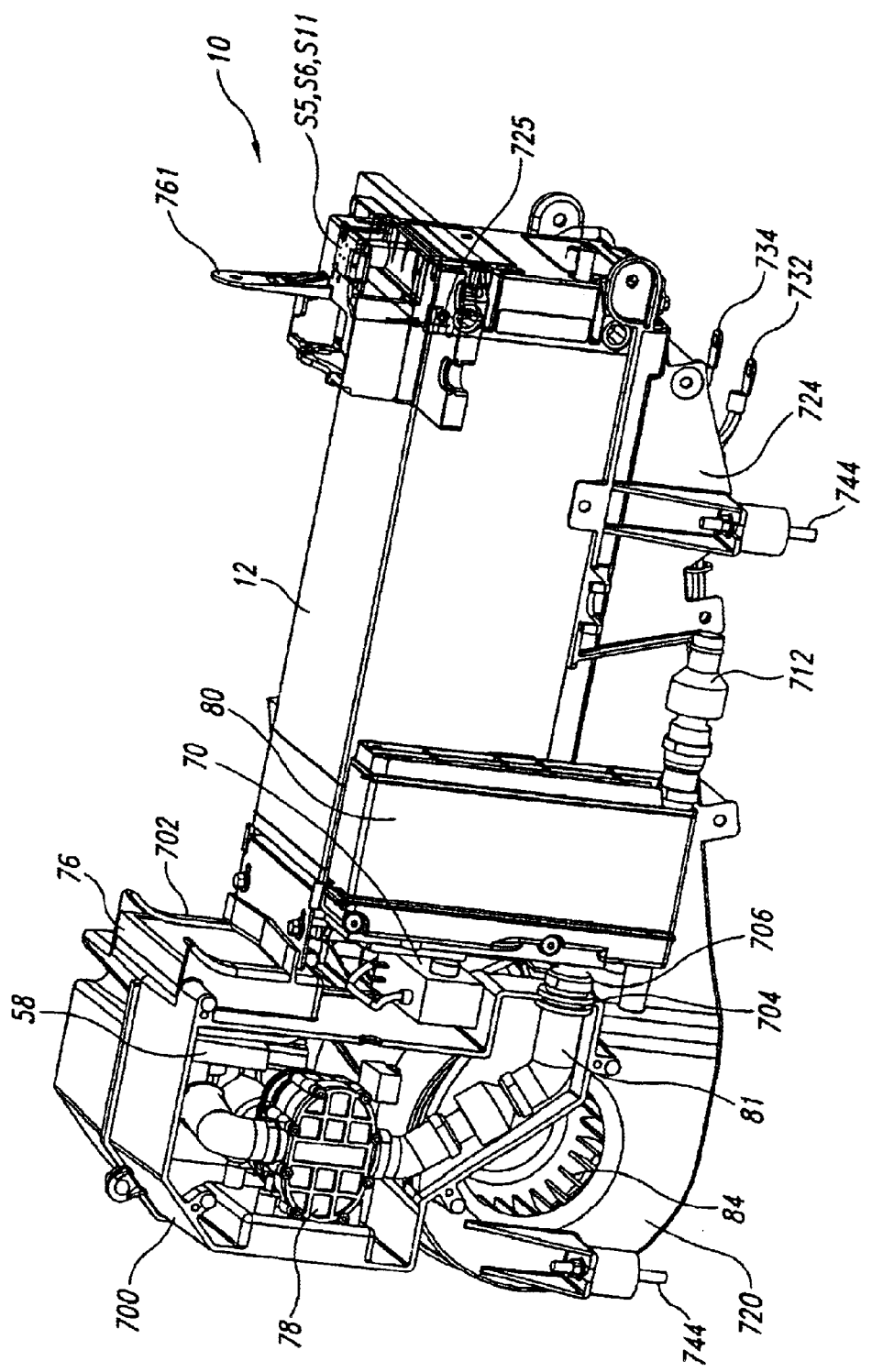
FIG. 6 is a top, right isometric view of the structural arrangement of various components of the fuel cell system of FIG. 5 with selected components removed from view.
Figure 7:
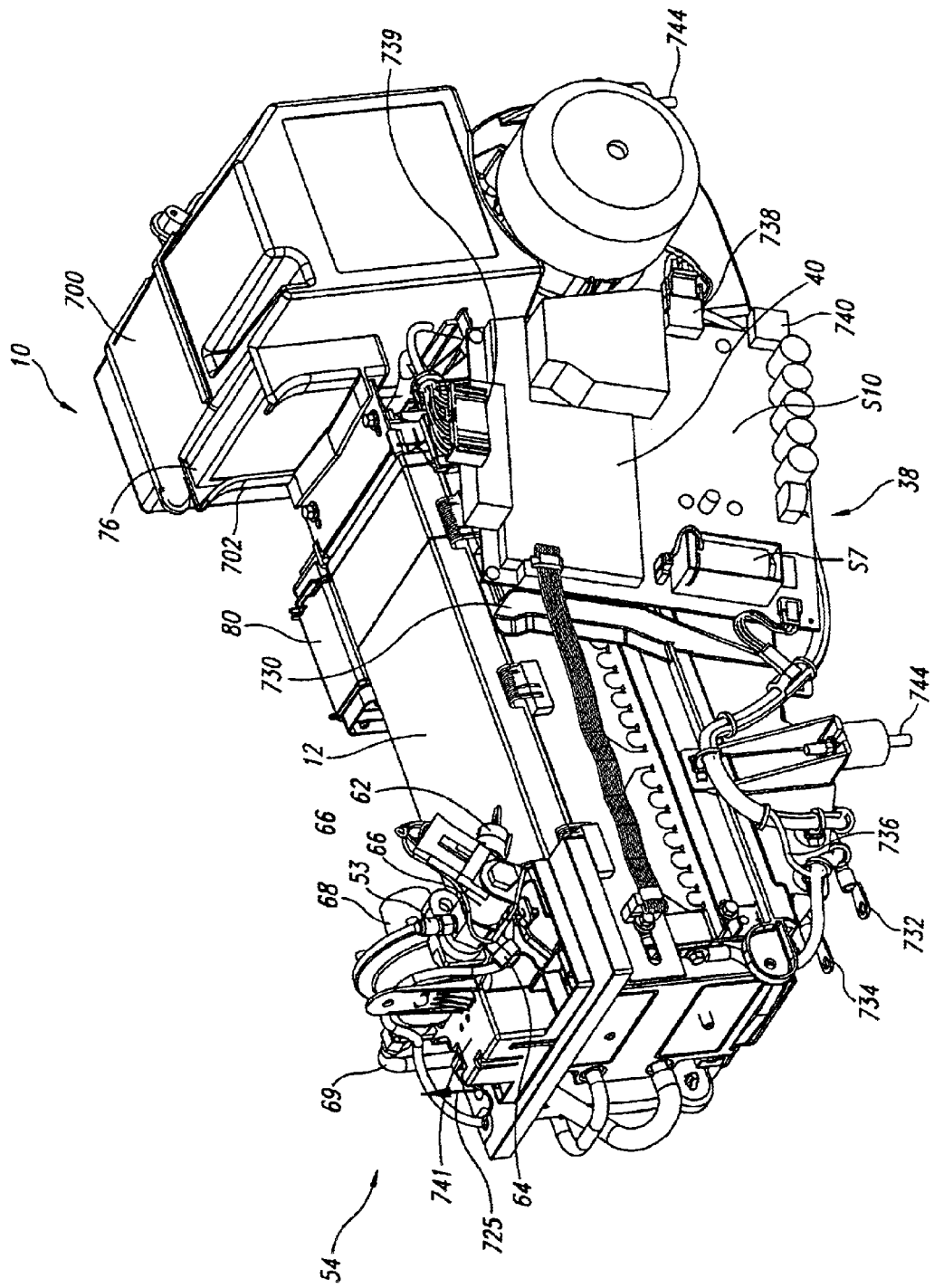
FIG. 7 is top, left isometric view of the structural arrangement of various components of the fuel cell system of FIG. 5.

Referring to FIGS. 5–7, the air compressor 78 and cooling fan 84 are grouped together at one end ("air supply end") of the fuel cell stack 12. Fuel tanks 52 (not shown in FIGS. 5–7) are mountable to the fuel cell system 10 on top of, and along the length of, fuel cell stack 12. The components of fuel regulating system 54 upstream of fuel cell stack 12 are located generally at the end of stack 12 ("hydrogen supply end") opposite the air supply end.

Air compressor 78 is housed within an insulated housing 700 that is removably attached to the fuel cell stack 12 at the air supply end. The housing 700 has an air supply aperture 702 covered by the filter 76 that allows supply air into housing 700. The air compressor 78 is a positive displacement low pressure type compressor and is operable to transmit supply air to oxidant air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on an inlet of air compressor 78 and preferably within the compressor housing 700.

Humidity exchanger 80 may be of the type disclosed in U.S. Pat. No. 6,106,964, and is mounted to one side of fuel cell stack 12 near the air supply end. Air entering into the humidity exchanger 80 via supply conduit 81 is humidified and then exhausted from the humidity exchanger 80 and into fuel cell stack 12 (via the supply air inlet port of the end plate 18b). Exhaust air from the fuel cell stack 12 exits via the exhaust air outlet port in end plate 18b and is directed into humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 below compressor housing 700. Fan housing 720 includes a duct 724 that directs coolant air from cooling fan 84 to the cooling channel openings at the bottom of fuel cell stack 12. Coolant air is directed upwards and through fuel cell stack 12 (via the cooling channels 32) and is discharged from the cooling channel openings at the top of fuel cell stack 12. During operation, heat extracted from fuel cell stack 12 by the coolant air is used to warm fuel tanks 52 that are mountable directly above and along the length of stack 12. Some of the warmed coolant air can be redirected into air supply aperture 702 of the compressor housing 700 for use as oxidant supply air.

Referring particularly to FIG. 7, the circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of power supply lines 732, 734 connects to circuit board 38 at a stack power-in terminal 738 and transmits some of the electricity generated by fuel cell stack 12 to power the components on the circuit board 38, as well as sensors 44 and actuators 46 which are electrically connected to circuit board 38 at terminal 739. Similarly, the battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at startup); once fuel cell stack 12 has reached nominal operating conditions, fuel cell stack 12 can also supply power to recharge battery 47.

Figure 8:
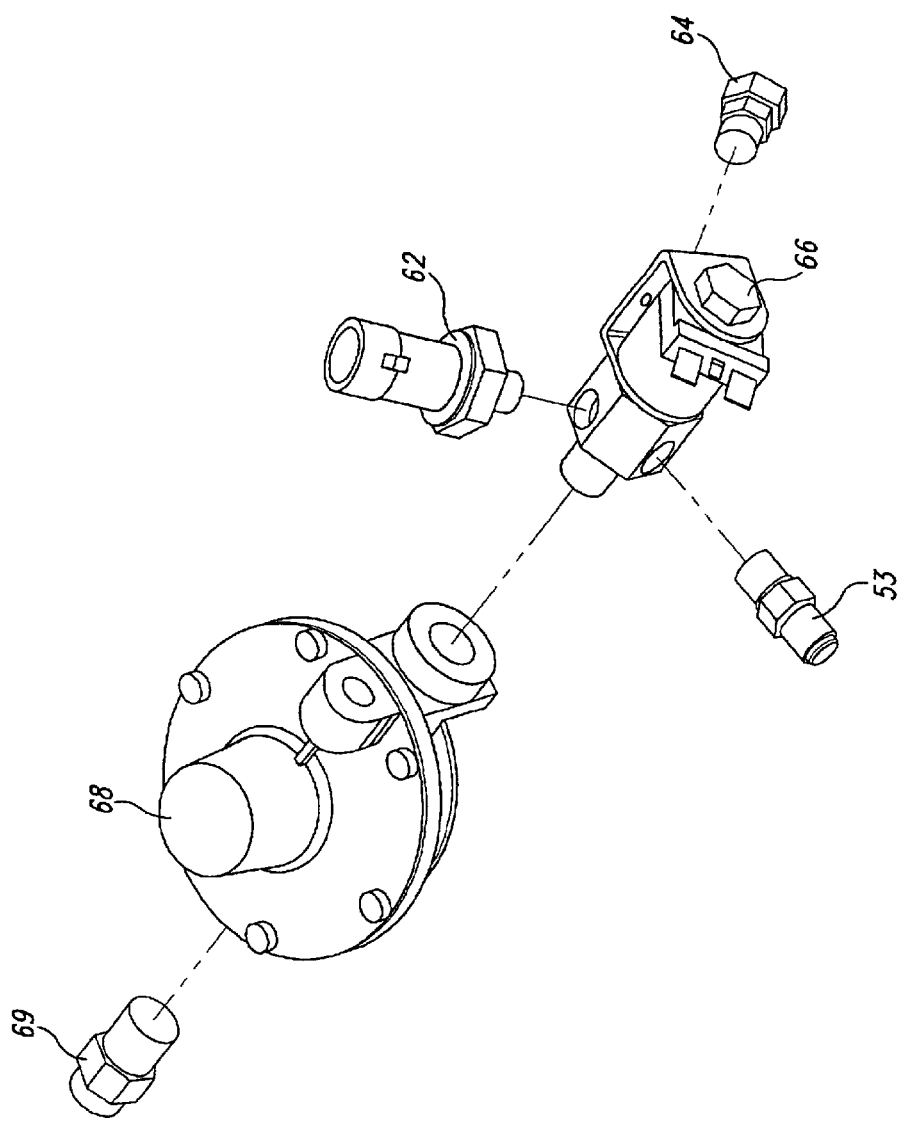
FIG. 8 is a top, right exploded isometric view of a fuel regulating portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. Pressure relief valve 64 is provided for fuel tanks 52 and may be set to open at about 350 psi. A low pressure relief valve 742 is provided for the fuel cell stack 12. Bracket 741 also provides a mount for hydrogen concentration sensor S5, hydrogen heater current sensor S6 and hydrogen sensor check sensor S11, which are visible in FIG. 6 in which bracket 741 is transparently illustrated in hidden line. Fuel tanks 52 are connectable to fuel tank connector 53. When fuel tank and main gas valves 56, 66 are opened, hydrogen is supplied under a controlled pressure (monitored by pressure sensor 62 and adjustable by hydrogen pressure regulator 68) through fuel supply conduit 69 to the fuel inlet port of end plate 18a.

Purge valve 70 is located at the fuel outlet port at end plate 18b. A purge conduit (not shown) connects purge valve 70 to an inlet in duct 724. Purge discharge is thus directed from purge valve 70, through the purge conduit and into the duct, wherein the purge discharge is diluted in the coolant air stream that is eventually exhausted from fuel cell system 10.

The fuel cell system 10 and fuel tanks 52 are housed within a system cover (not shown) and coupled to a base (not shown) at mounting points 744. The portion of the cover covering the stack 12 and fuel regulating system 54 is shaped so that coolant air exhausted from the top of the fuel cell stack 12 is directed by this portion of the cover, past fuel regulating system 54 and hydrogen concentration sensor S5, through an outlet (not shown) in the cover and out of fuel cell system 10.

The fuel cell system 10 is designed so that components that are designed to discharge hydrogen or that present a risk of leaking hydrogen, are as much as practical, located in the cooling air path or have their discharge or leakage directed to the cooling air path. The cooling air path is defined by duct 724, cooling air channels of stack 12, and the portion of the system cover above stack 12; a cooling air stream passing through the cooling air path is shown by the arrows 725 in FIGS. 5, 6 and 7. Components directly in the cooling air path include fuel tanks 52, and components of fuel regulating system 54 such as pressure relief valve 64, main gas valve 66, and hydrogen regulator 68. Components not directly in the cooling air path that are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked or discharged hydrogen through duct 724, past stack 12, and out of system 10 in the direction of the arrows shown in FIGS. 5, 6, and 7. Hydrogen concentration sensor S5 is strategically placed far downstream in the cooling air stream to detect hydrogen carried in the cooling air stream.

Hydrogen concentration sensor S5 is also placed in the vicinity of the components of fuel regulating system 54 to improve detection of hydrogen leaks or discharges from fuel regulating system 54.

Although specific embodiments, and examples for, the invention are described herein for illustrative purposes, various equivalent modifications can be made without departing from the spirit and scope of the invention, as will be recognized by those skilled in the relevant art. For example, the hydrogen sensor may be installed in the oxidant exhaust conduit or somewhere in the oxidant stream downstream of the stack. If the sensor is placed in the oxidant exhaust stream, the oxidant exhaust stream may be positioned so that the sensor is also in the vicinity of the fuel regulating system. The teachings provided herein of the invention can be applied to other fuel cell systems, not necessarily the PEM fuel cell system described above.

Commonly assigned U.S. patent applications Ser. No. 09/916,241, entitled FUEL CELL AMBIENT ENVIRONMENT MONITORING AND CONTROL APPARATUS AND METHOD; Ser. No. 09/916,117, entitled FUEL CELL CONTROLLER SELF INSPECTION Ser. No. 09/916,115, entitled FUEL CELL ANOMALY DETECTION METHOD AND APPARATUS; Ser. No: 09/916,211, entitled FUEL CELL PURGING METHOD AND APPARATUS; Ser. No. 09/916,213, entitled FUEL CELL RESUSCITATION METHOD AND APPARATUS; Ser. No. 09/916,240, entitled FUEL CELL SYSTEM METHOD, APPARATUS AND SCHEDULING; Ser. No. 09/916,239, entitled FUEL CELL SYSTEM AUTOMATIC POWER SWITCHING METHOD AND APPARATUS; and Ser. No. 09/916,118, entitled PRODUCT WATER PUMP FOR FUEL CELL SYSTEM, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. An electric power generating system, comprising:
   a fuel cell stack comprising at least one solid polymer fuel cell;
   a cooling system comprising a coolant flow path for directing coolant to and from the stack;
   a fuel regulating system comprising a fuel flow path and for regulating the supply of fuel from a fuel supply to the stack via the fuel flow path;
   an oxidant delivery system comprising an oxidant flow path to supply an oxidant to the stack; at least a portion of the oxidant flow path different from the coolant flow path and,
   a hydrogen concentration sensor located in the vicinity of the fuel regulating system, and in the coolant flow path at a location downstream of the stack.

2. The electric power generating system of claim 1, further comprising:
a fuel supply connector for connecting the fuel supply to the fuel flow path forming at least a portion of the fuel regulating system.

3. The electric power generating system of claim 2, further comprising:
a pressure relief valve in the fuel flow path forming at least a portion of the fuel regulating system.

4. The electric power generating system of claim 3, further comprising:
a main fuel valve in the fuel flow path forming at least a portion of the fuel regulating system.

5. The electric power generating system of claim 4, further comprising:
a hydrogen pressure regulator in the fuel flow path forming at least a portion of the fuel regulating system.

6. The electric power generating system of claim 1 wherein the coolant is air.

7. The electric power generating system of claim 6, further comprising:
a fan for directing coolant air to the stack forming at least a portion of the cooling system.

8. The electric power generating system of claim 7, further comprising:
a duct for directing the coolant air from the fan to the stack forming at least a portion of the coolant flow path.

9. The electric power generating system of claim 8, further comprising:
a number of coolant flow channels formed in the stack for enabling passage of coolant air through the stack forming at least a portion of the coolant flow path.

10. The electric power generating system of claim 8, further comprising:
a power generating system housing portion forming at least a portion of the coolant flow path that directs coolant air exhausted from the stack to the hydrogen concentration sensor.

11. An electric power generating system, comprising:
a fuel cell stack comprising at least one solid polymer fuel cell;
a cooling system comprising a coolant flow path for directing coolant to and from the stack;
a fuel regulating system comprising a fuel flow path and for regulating the supply of fuel from a fuel supply to the stack via the fuel flow path wherein the fuel regulating system is located in the coolant flow path at a location downstream of the stack; and
a hydrogen concentration sensor located in the vicinity of the fuel regulating system, and in the coolant flow path at a location downstream of the stack.

12. The electric power generating system of claim 11, further comprising:
a conduit coupled to the stack and for directing a fuel exhaust stream from the stack to the coolant flow path.

13. An electric power generating system, comprising:
an air-cooled fuel cell stack comprising at least one solid polymer fuel cell;
a cooling system comprising a coolant air delivery device and a coolant air flow path for directing coolant air to and from the stack;
a fuel regulating system for regulating the supply of fuel from a fuel supply to the stack, the fuel regulating system comprising a fuel flow path for directing fuel from the fuel supply to the stack, a fuel supply connector for connecting the fuel supply to the fuel flow path, a fuel pressure relief valve in the fuel flow path, a main fuel valve in the fuel flow path, and a pressure regulator in the fuel flow path,
an oxidant delivery system comprising an oxidant flow path to supply an oxidant to the stack; at least a portion of the oxidant flow path different from the coolant flow path; and,
a hydrogen concentration sensor located in the vicinity of the fuel regulating system, and in the coolant flow path at a location downstream of the stack.

14. The electric power generating system of claim 13, further comprising:
a conduit coupled to the stack and for directing a fuel exhaust stream from the stack to the coolant air flow path.

15. An electric power generating system, comprising:
an air-cooled fuel cell stack comprising at least one solid polymer fuel cell;
a cooling system comprising a coolant air delivery device and a coolant air flow path for directing coolant air to and from the stack;
a fuel regulating system for regulating the supply of fuel from a fuel supply to the stack, wherein the fuel regulating system is located in the coolant air flow path at a location downstream of the stack and comprises a fuel flow path for directing fuel from the fuel supply to the stack, a fuel supply connector for connecting the fuel supply to the fuel flow path, a fuel pressure relief valve in the fuel flow path, a main fuel valve in the fuel flow path, and a pressure regulator in the fuel flow path; and,
a hydrogen concentration sensor located in the vicinity of the fuel regulating system, and in the coolant flow path at a location downstream of the stack.

16. The electric power generating system of claim 15 wherein the coolant air delivery device is a fan.

17. The electric power generating system of claim 16, further comprising:
a duct forming at least a portion of the coolant flow path for directing the coolant air from the fan to the stack.

18. The electric power generating system of claim 17, further comprising:
a number of coolant flow channels formed in the stack for enabling passage of cooling air through the stack.

19. The electric power generating system of claim 18, further comprising:
a power generating system housing portion forming at least a portion of the coolant air flow path that directs coolant air exhausted from the stack to the hydrogen concentration sensor.

20. An electric power generating system, comprising:
a fuel cell stack comprising at least one solid polymer fuel cell;
a coolant flow path for directing coolant to and from the stack;
a fuel regulating system for regulating the supply of fuel from a fuel supply to the stack wherein the fuel regulating system further forms a fuel flow path for directing the fuel supply to the stack and is located in the coolant flow path at a location downstream of the stack; and
a hydrogen concentration sensor located in the coolant flow path at a location downstream of the stack and in the vicinity of the fuel regulating system.

21. The electric power generating system of claim 20 wherein the coolant is air.

22. The electric power generating system of claim 21, further comprising:
   a fuel supply valve connectable to the fuel supply source forming at least a portion of the fuel regulating system.

23. The electric power generating system of claim 22, further comprising:
   a pressure relief valve in the fuel flow path forming at least a portion of the fuel regulating system.

24. The electric power generating system of claim 23, further comprising:
   a main fuel valve in the fuel flow path forming at least a portion of the fuel regulating system.

25. The electric power generating system of claim 24, further comprising:
   a hydrogen pressure regulator in the fuel flow path forming at least a portion of the fuel regulating system.

26. The electric power generating system of claim 21 wherein the coolant flow path includes a duct for directing the coolant to the stack.

27. The electric power generating system of claim 26, further comprising:
   a number of coolant flow channels formed in the stack for enabling passage of coolant air through the stack.

28. An electric power generating system, comprising:
   a fuel cell stack comprising at least one solid polymer fuel cell;
   means for directing coolant to and from the stack, comprising a coolant flow path;
   means for regulating the supply of fuel from a fuel supply to the stack;
   means for supplying an oxidant to the stack, comprising an oxidant flow path at least a portion of which is different from the coolant flow path; and,
   a hydrogen concentration sensor located in the vicinity of the means for regulating the supply of fuel, and in the coolant flow path at a location downstream of the stack and the means for regulating the supply of fuel.

* * * * *